(12) United States Patent
Mitchell

(10) Patent No.: US 6,712,248 B2
(45) Date of Patent: Mar. 30, 2004

(54) FOLDABLE CARGO CARRYING BASKET

(76) Inventor: Victor C. Mitchell, P.O. Box 236, Ottawa, KS (US) 66067

( * ) Notice: Subject to any disclaimer, the term of this patent is extended or adjusted under 35 U.S.C. 154(b) by 69 days.

(21) Appl. No.: 10/096,734

(22) Filed: Mar. 13, 2002

(65) Prior Publication Data
US 2003/0173387 A1 Sep. 18, 2003

(51) Int. Cl.$^7$ ................................................. B60R 9/00
(52) U.S. Cl. ........................ 224/499; 224/498; 224/503; 224/507; 224/519
(58) Field of Search .................. 224/282, 492, 224/498, 499, 503, 505, 506, 507, 508, 509, 519; 280/769

(56) References Cited

U.S. PATENT DOCUMENTS

| | | | |
|---|---|---|---|
| 1,686,450 A | * 10/1928 | Henry | 224/498 |
| 3,912,098 A | 10/1975 | Nicotra | |
| 3,913,811 A | 10/1975 | Spencer | |
| 4,221,311 A | * 9/1980 | Penn | 224/503 |
| 4,906,015 A | 3/1990 | LaCroix et al. | |
| 5,092,503 A | 3/1992 | Cocks | |
| 5,106,002 A | 4/1992 | Smith et al. | |
| 5,427,289 A | 6/1995 | Ostor | |
| 5,676,292 A | * 10/1997 | Miller | 224/282 |
| 5,755,480 A | * 5/1998 | Bryan | 224/492 |
| 5,775,560 A | * 7/1998 | Zahn et al. | 224/506 |
| 5,850,959 A | * 12/1998 | Miller | 224/506 |
| 6,024,263 A | * 2/2000 | Lewis et al. | 224/509 |
| 6,202,909 B1 | 3/2001 | Belinky et al. | |
| 6,390,343 B1 | * 5/2002 | Jain | 224/505 |
| 6,502,730 B2 | * 1/2003 | Johnson | 224/519 |

* cited by examiner

*Primary Examiner*—Gary E. Elkins
(74) *Attorney, Agent, or Firm*—Dale J. Ream

(57) ABSTRACT

A foldable cargo carrying basket includes a mounting bar capable of being mounted to a vehicle hitch. Supported by a support bar and main frame member, the basket includes an upstanding front wall. A platform is pivotally coupled to the main support member and selectively movable between configurations perpendicular or parallel to the front wall. The basket includes side walls pivotally coupled to opposed struts of the front wall and movable between configurations perpendicular or parallel to the front wall. When coupled to the platform, the side walls receive a significant portion of any load forces encountered by a loaded platform. A rear wall may be pivotally coupled to the platform. The side walls may be coupled to the rear wall so as to be indirectly connected to the platform for load distribution. The platform and each wall include a framework with a metal mesh overlying respective frameworks.

20 Claims, 11 Drawing Sheets

FOLDABLE CARGO CARRYING BASKET

BACKGROUND OF THE INVENTION

This invention relates generally to cargo carriers for use with vehicles and, more particularly, to a cargo carrying basket that is mountable to a vehicle and selectively foldable or extendable for carrying various articles and optimally distributing the weight load of those articles.

Many vehicles do not have the cargo capacity to transport large or heavy objects. Even modern sport utility vehicles (SUV's) are often found not to have a satisfactory cargo capacity. Various rear mounted cargo carriers have been proposed for increasing the cargo capacity of a vehicle. Although assumably effective for their intended purposes, existing devices either undesirably stick out when not in use or do not allow simultaneous hitch attachment of other devices. Further, existing devices do not provide for optimal stability and load distribution in use.

Therefore, it is desirable to have a cargo carrying basket that is foldable and collapsible when not in use while still mounted to a vehicle. Further, it is desirable to have a cargo carrying basket which provides optimal stability and load distribution during use. It is also desirable to have a cargo carrying basket that enables hitch mounting of other devices while still mounted to a vehicle.

SUMMARY OF THE INVENTION

A foldable cargo carrying basket according to this invention includes a mounting bar capable of being releasably mounted to a hitch sleeve of a vehicle. A support bar connected to the mounting bar supports an elongate main frame member above the mounting bar. The framework of a front wall extends upwardly from the main frame member and includes opposed upstanding struts. The framework of a platform is pivotally coupled to the main support member such that the platform is movable between an extended configuration perpendicular to the front wall and a folded configuration parallel to the front wall. The cargo carrying basket also includes a pair of side walls with each side wall having a framework pivotally coupled to a corresponding upstanding strut of the front wall framework. Therefore, the side walls are movable between an extended configuration perpendicular to and extending away from the front wall and a folded configuration parallel to and overlapping the front wall. When both the side walls and platform are in the folded configurations, the basket is collapsed and does not undesirably stick out from the rear of the vehicle. While in this configuration, a hitch ball on the mounting bar may also be utilized to pull a trailer, etc. A rear wall having a framework may also be pivotally coupled to the platform frame and selectively movable between extended and folded configurations. A mesh material overlies each framework.

Therefore, a general object of this invention is to provide a cargo carrying basket which is mountable to the rear of a vehicle for expanding the cargo capacity thereof.

Another object of this invention is to provide a cargo carrying basket, as aforesaid, having a platform that is vertically foldable when not in use and while still mounted to a vehicle.

Still another object of this invention is to provide a cargo carrying basket, as aforesaid, having side walls that may be folded inwardly when the basket is not in use.

Yet another object of this invention is to provide a cargo carrying basket, as aforesaid, in which the side walls bear a distributive share of the load forces of weight carried upon the platform.

A further object of this invention is to provide a cargo carrying basket, as aforesaid, having a rear wall pivotally coupled to the platform for selectively containing articles upon the platform or allowing elongate articles to extend rearwardly.

A still further object of this invention is to provide a cargo carrying basket, as aforesaid, that enables connection of other hitch mounted devices.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 6b is an isolated perspective view on an enlarged scale of the connection between a side wall framework and platform framework as shown in FIG. 6a;

FIG. 7b is an isolated perspective view on an enlarged scale of the connection between a side wall framework and rear wall framework as shown in FIG. 7a;

FIG. 8a is a perspective view of the basket as in FIG. 7a;

FIG. 8b is an isolated perspective view on an enlarged scale of a bumper bracket as shown in FIG. 8a;

DESCRIPTION OF THE PREFERRED EMBODIMENT

Figure 1:
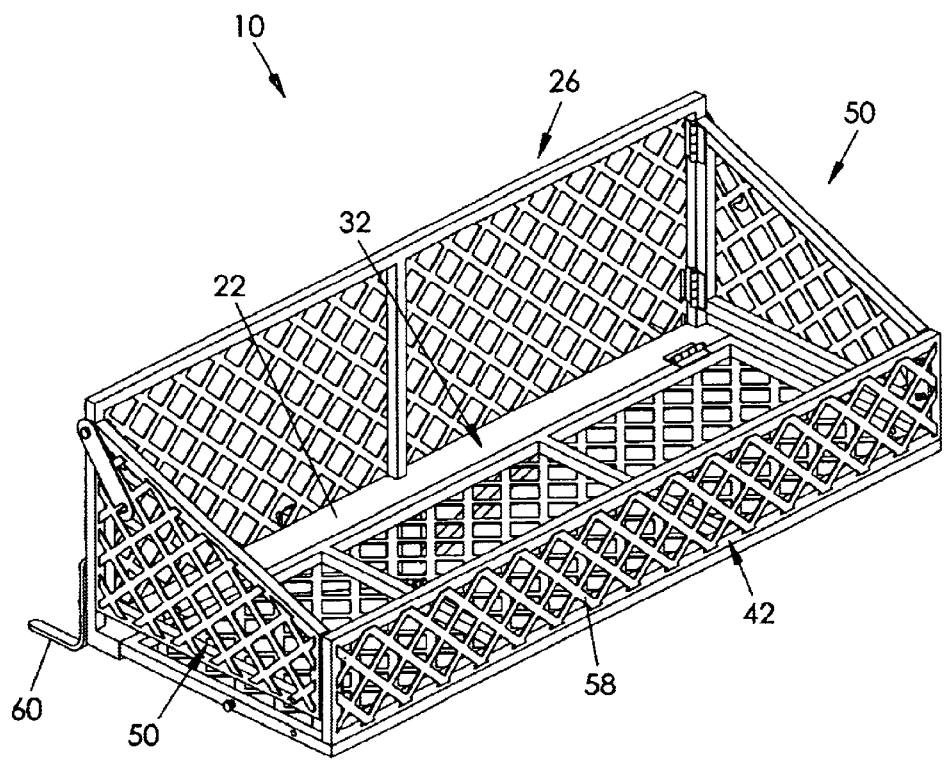
FIG. 1 is a perspective view of a cargo carrying basket according to a preferred embodiment of the present invention.

A foldable cargo carrying basket according to the present invention will now be described in detail with reference to FIGS. 1 through 11 of the accompanying drawings. A cargo carrying basket 10 according to a preferred embodiment of the invention is shown in FIGS. 1 through 8 and includes a mounting bar 12 having opposed first 14 and second 16 ends. The mounting bar 12 includes a generally cubical configuration such that the first end 14 thereof may be inserted into a hitch sleeve of a vehicle. Side walls of the mounting bar 12 define apertures 18 such that the mounting bar 12 may be releasably secured to the hitch sleeve with a bolt, pin, or like fastener (not shown). A ball hitch 20 is fixedly attached to the second end 16 of the mounting bar 12 such that a trailer or other hitch mounted device may be connected to the cargo basket 10 and pulled by the vehicle, as to be further described later.

Figure 2:
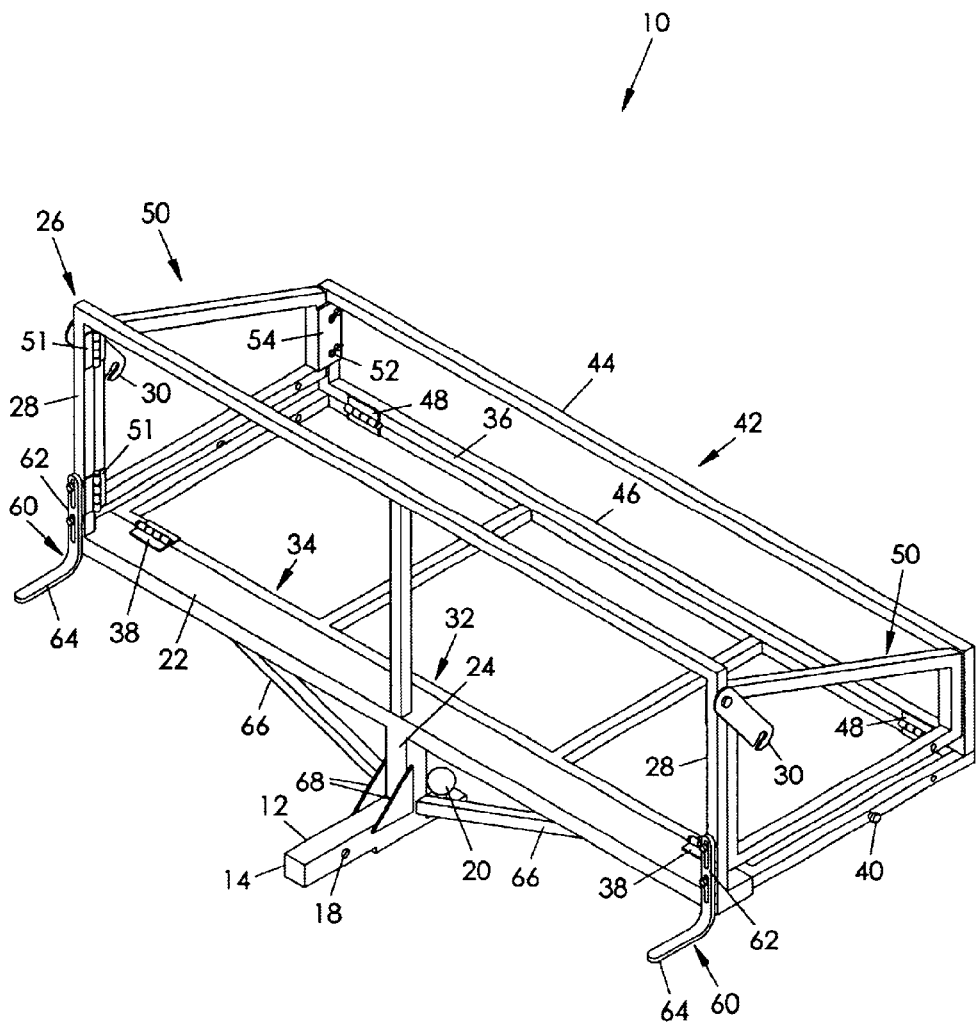
FIG. 2 is a perspective view of the basket as in FIG. 1 from a another angle and with the mesh material removed.

The cargo carrying basket 10 includes an elongate main frame member 22 having a linear configuration (FIG. 2). Preferably, the main frame member 22 and the other frame components to be described below are constructed of steel although aluminum or even a durable plastic material would also work. A support bar 24 extends upwardly from a point intermediate first 14 and second 16 ends of the mounting bar 12 and extends between the mounting bar 12 and the main frame member 22 (FIG. 2). Therefore, the support bar 24 supports the cargo carrying basket 10 upon the mounting bar 12. The main frame member 22 is oriented perpendicular to the mounting bar 12 and defines a width dimension. Preferably, the main frame member 22 defines a basket width substantially equal to the width of the vehicle to which it is mounted although various widths are contemplated and would be suitable for various applications.

An upstanding front wall 26 having a generally rectangular configuration is fixedly attached to a top surface of the main frame member 22 (FIG. 1) and includes a framework. The front wall framework includes a pair of upstanding end struts 28 extending upwardly from opposed ends of the main frame member 22 with an upper frame bar extending between the end struts (FIG. 2). The front wall framework may also include intermediate struts extending between the main frame member 22 and upper frame bar for added strength and stability.

Figure 3:
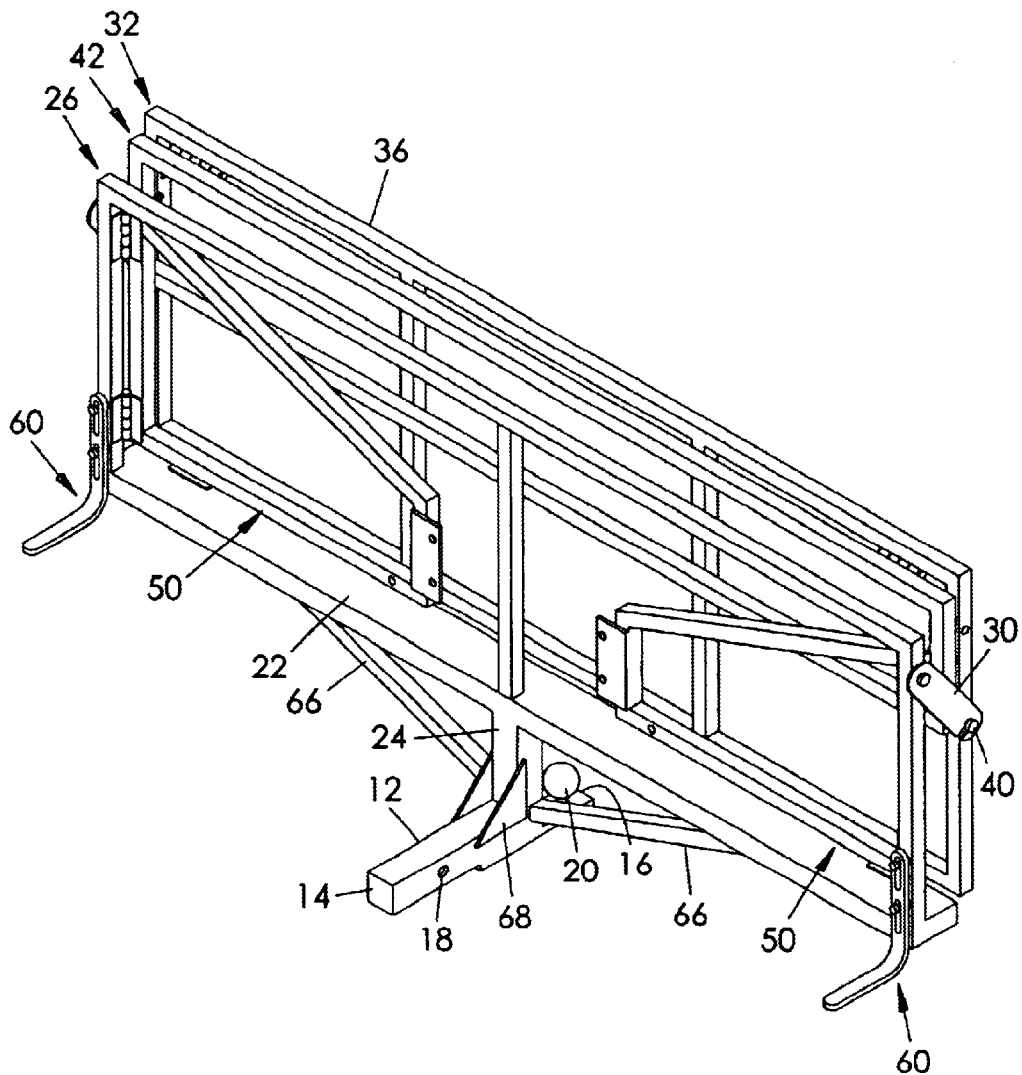
FIG. 3 is a perspective view of the basket as in FIG. 2 in a collapsed configuration.

The basket 10 further includes a platform 32 having a framework. The platform framework includes first 34 and second 36 parallel frame bars with intermediate struts extending therebetween (FIG. 2). The first frame bar 34 is pivotally coupled to the main frame member 22 with a pair of spaced apart hinges 38 or other suitable fastener such that the platform 32 is selectively movable between a first configuration generally perpendicular to the front wall 26 (FIG. 2) and a second configuration generally parallel to the front wall 26 (FIG. 3). The front wall 26 includes a pair of latches 30 and the platform 32 includes a pair of flanges 40 such that the platform 32 may be releasably held in the folded FIG. 3 configuration.

Figure 4:
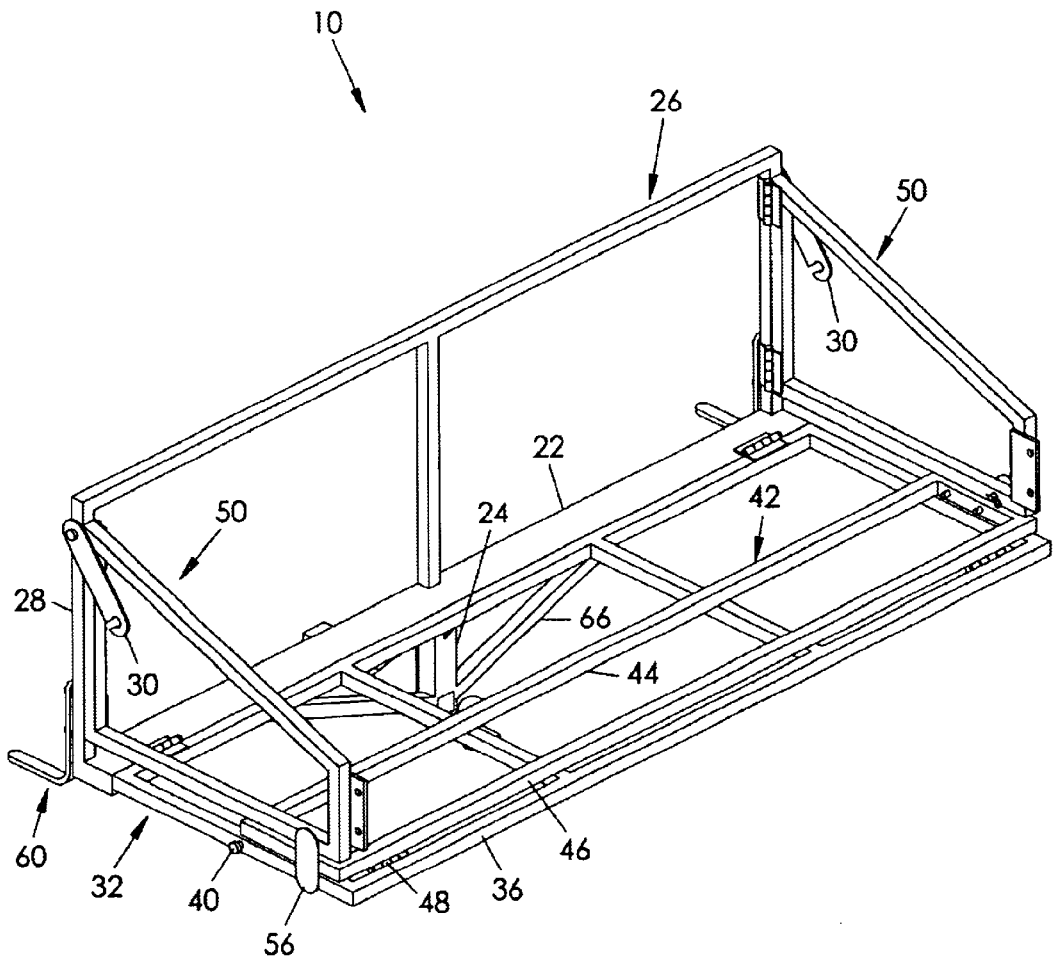
FIG. 4 is a perspective view as in FIG. 1 with the mesh material removed and with a rear wall in a folded configuration.
Figure 5:
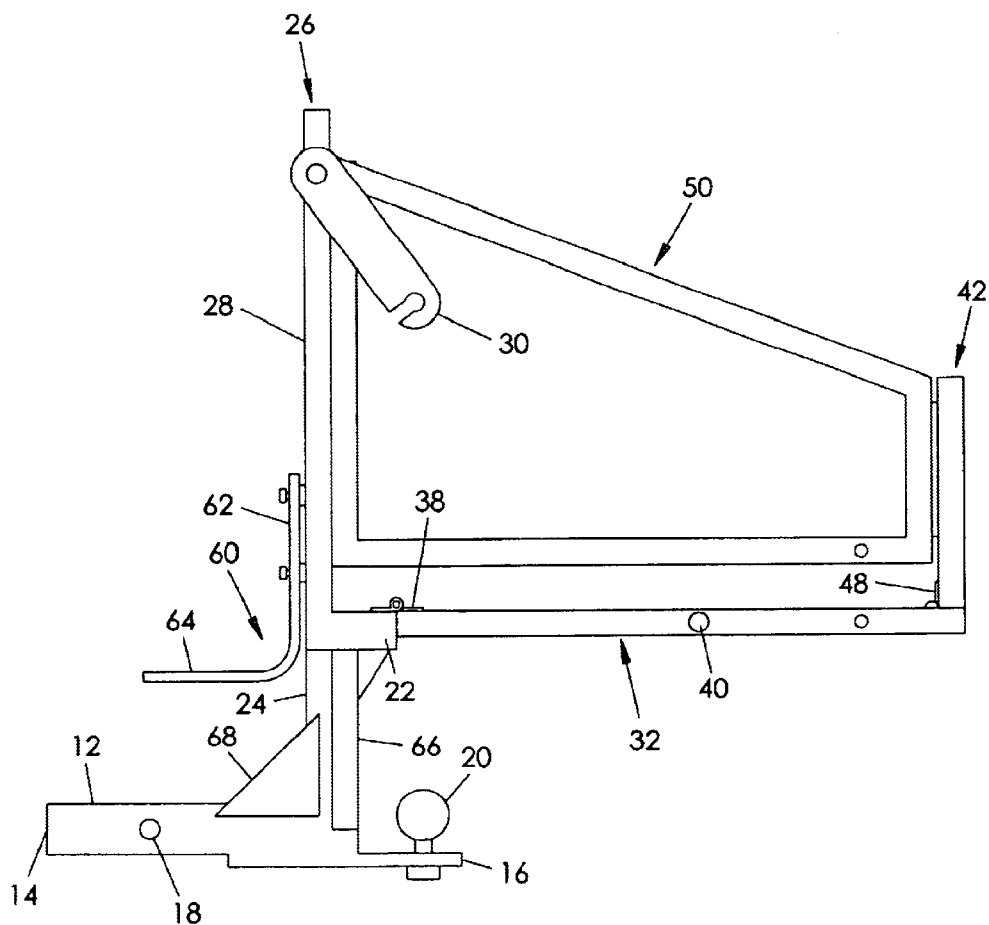
FIG. 5 is a side view of the basket as in FIG. 2 on an enlarged scale.
Figure 6B:
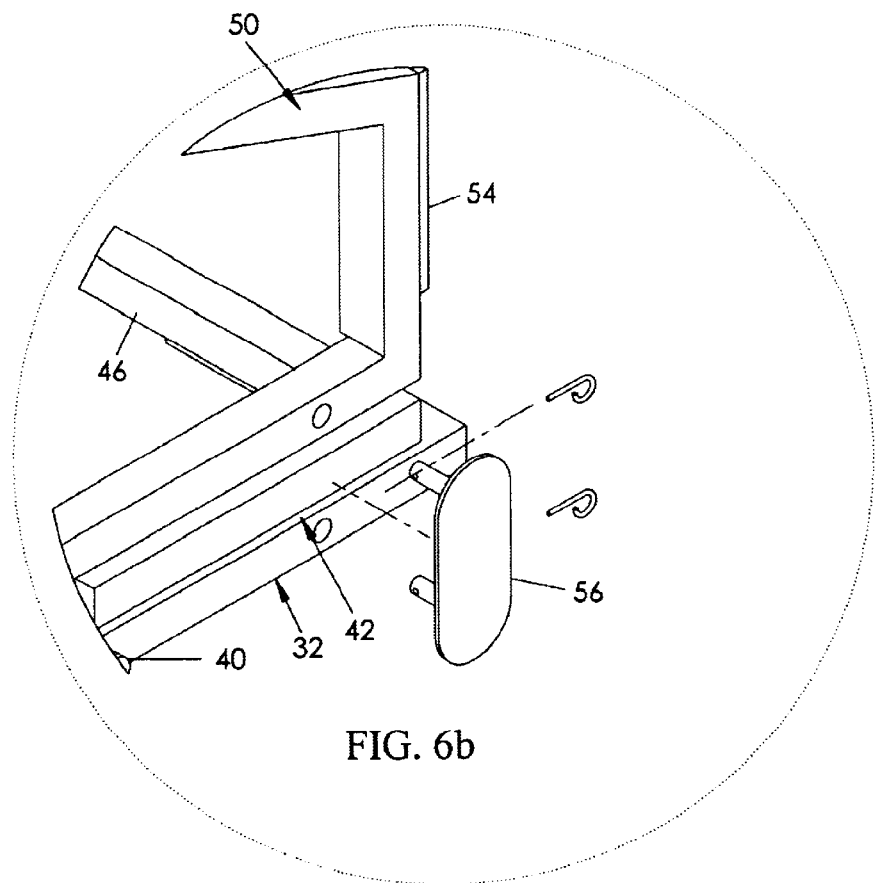
Figure 6A:
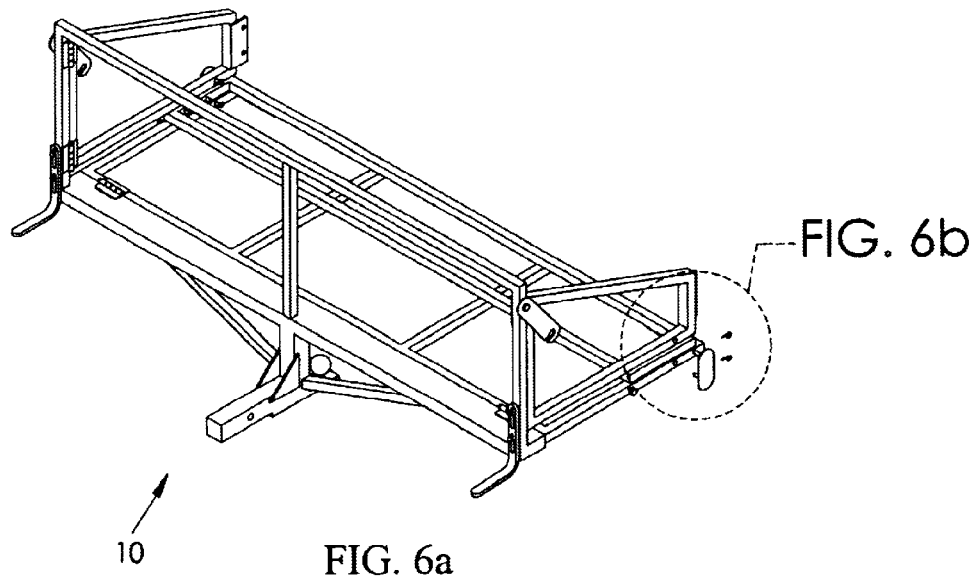
FIG. 6a is a perspective view from another angle of the basket as in FIG. 4 on a reduced scale.

The cargo carrying basket 10 may also include a generally rectangular rear wall 42 having a corresponding framework (FIG. 2). The rear wall framework includes upper 44 and lower 46 frame bars connected by end struts, the lower frame bar 44 being pivotally connected to the second frame bar 36 of the platform framework with hinges 48 or other suitable fastener. Therefore, the rear wall 42 is pivotally movable between a first upstanding configuration generally perpendicular to the platform 32 (FIG. 2) and generally parallel to the front wall 26 and a second folded configuration overlapping the platform 32 (FIG. 4). The folded configuration allows long or large articles being transported on the platform 32 to extend rearwardly from the basket 10 and vehicle.

Figure 7B:
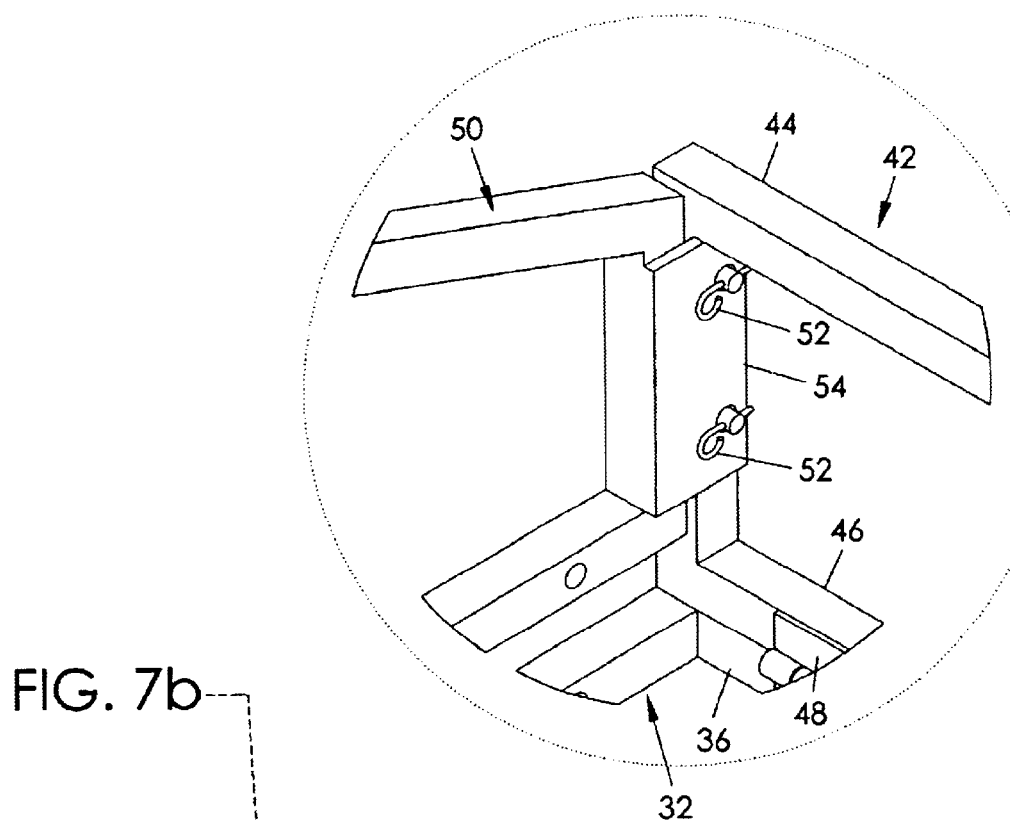
Figure 7A:
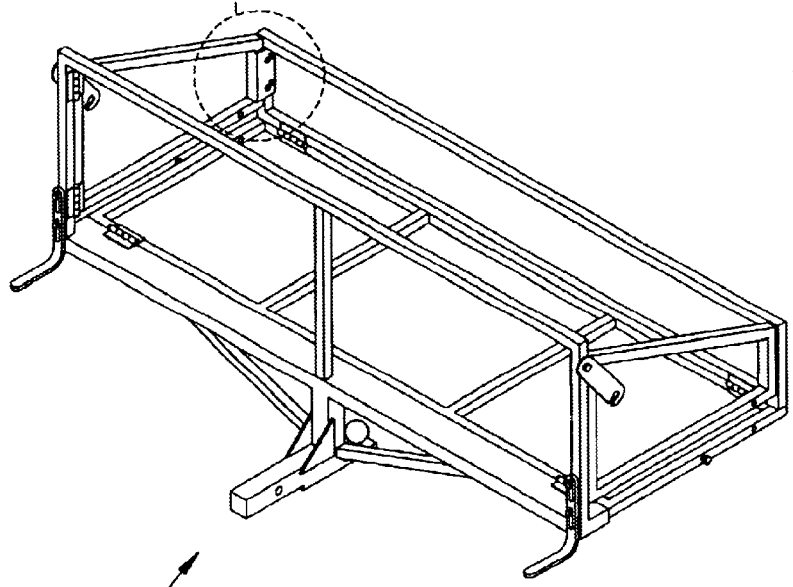
FIG. 7a is a perspective view of the basket as in FIG. 2 on a reduced scale.

The cargo carrying basket 10 further includes a pair of side walls 50 (FIG. 2), each side wall having a framework. An upstanding member of each side wall framework is pivotally coupled to a corresponding end strut 28 of the front wall 26 with hinges 51 such that each side wall 50 is selectively movable between a first configuration generally perpendicular to the front wall 26 (FIG. 2) and a second (folded) configuration overlapping the front wall 26 (FIG. 3). As shown in FIGS. 7a and 7b, the framework of each side wall 50 may be releasably coupled to a corresponding end strut of the rear wall 42 with pins 52 or like fasteners when the rear wall 42 is in its upstanding configuration and the side wall 50 is in a first (FIG. 2) configuration. A flange 54 is fixedly attached to each side wall 50 for this purpose (FIG. 7b). The cargo carrying basket 10 also includes a bracket 56 for connection to corresponding side wall and platform frameworks such that the side walls 50 may be held in the first configuration thereof even when the rear wall 42 is in its folded configuration (FIG. 4).

Connection of the side walls 50 to the rear wall 42 or platform 32 is important for proper distribution of the load forces of an article resting on the platform 32 to all of the frame structures. More particularly, the side walls 50 actually become load bearing structures when ultimately connected to the platform 32. This is important as it reduces load forces upon the hinges 38 connecting the platform 32 to the main frame member 22. Without the side walls 50 becoming weight bearing structures, a static analysis of weight distribution shows that the hinges 38 bear a load approximately 12 times the weight of cargo positioned on the platform 32. For example, a 500 pound cargo on the platform 32 would result in 6000 pounds of load forces on the hinges 38. However, by connecting the side walls to the front wall 26 and platform 32 (either directly or through the rear wall 42), horizontal loading is created and the platform load is distributed in part to the side walls 50. Therefore, loading the side walls 50 greatly reduces the stress on the remaining basket frame structures.

As shown in FIG. 1, a mesh material 58 overlays the front wall 26, rear wall 42, side walls 50, and platform 32. Preferably, this mesh material includes a metal construction so as to create a secure boundary for articles stowed on the platform 32 although a flexible nylon mesh would also work.

Figure 8B:
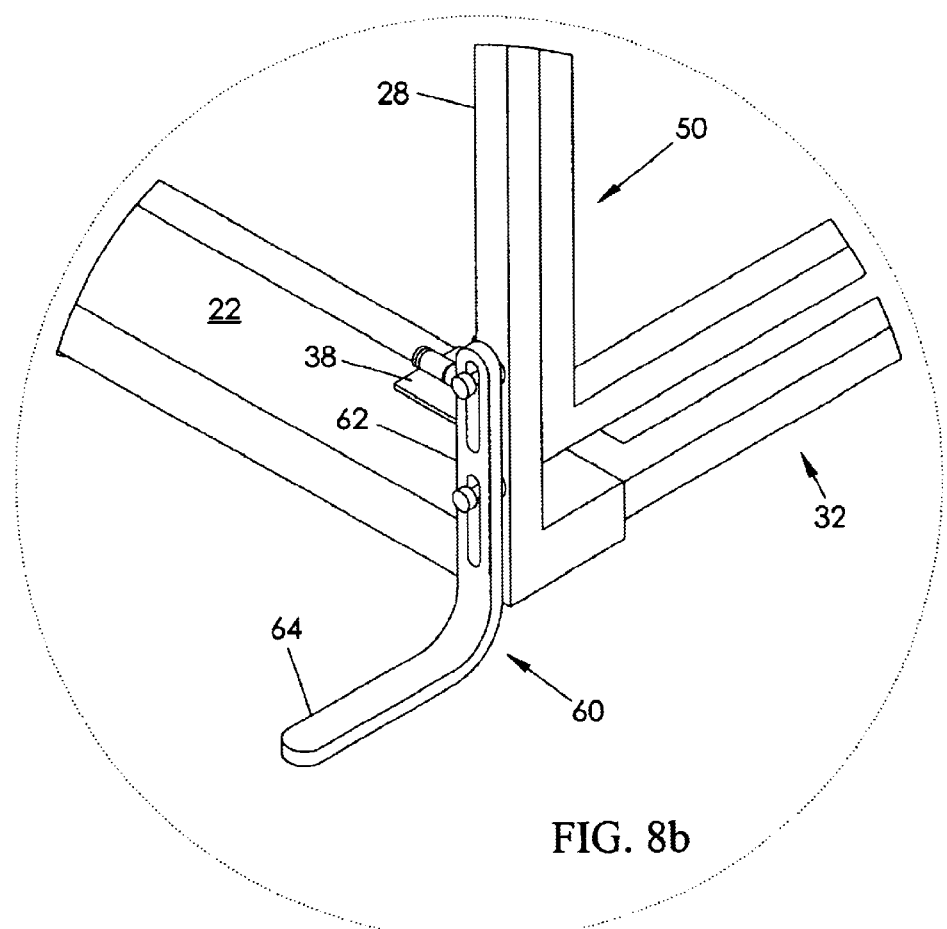
Figure 8A:
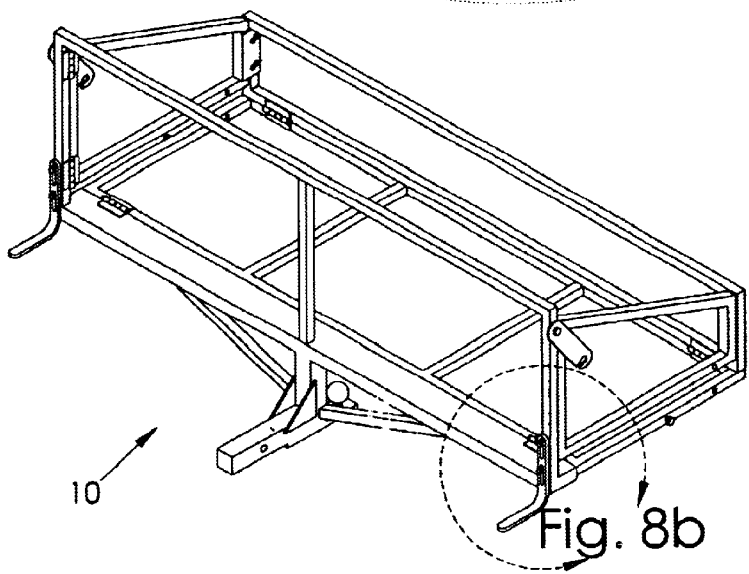

The basket 10 further includes a pair of bumper brackets 60 (FIG. 2). Each bracket 60 includes a generally L-shaped configuration, an upper portion 62 being releasably coupled to a respective front wall end strut 28 with screws or the like and a lower portion 64 extending perpendicular thereto for contact with the rear bumper of the vehicle to which the basket 10 is mounted (FIGS. 8a and 8b). Each upper portion 62 defines slots relative to the mounting screws for vertically adjusting the position of respective brackets on the end struts 28.

A pair of stabilizer bars 66 extend in opposed directions between the mounting bar 12 and a bottom surface of the main frame member 22. A pair of gussets 68 extend between the support bar 24 and the mounting bar for providing triangulated support of cantilevered load forces that are caused by the weight of cargo on the platform 32.

In use, the cargo carrying basket 10 may be mounted to a vehicle's hitch sleeve by inserting and securing the mounting bar 12 therein. When not in use, the platform 32 and side walls 50 may be pivoted to their respective folded configurations so as to minimize the extension of the basket 10 behind the vehicle. In this configuration, trailers or other devices requiring hitch attachment may be coupled to the ball hitch 20 at the second end 16 of the mounting bar 12. For use, the platform 32 may be folded down perpendicular to the front wall 26 and the side walls 50 may be outwardly extended and coupled to either the rear wall 42 or platform frameworks. The rear wall 42 may be pivoted to either its upstanding or folded configuration depending on whether cargo to be placed on the platform 32 needs to extend rearwardly beyond the rear wall 42.

Alternatively, the cargo carrying basket 10 may include a cover made of nylon or other flexible material (not shown).

This cover may be attached to the front wall for extension over the platform and may include means for releasable attachment to the rear wall 42, such as with snaps or the like.

Figure 9:
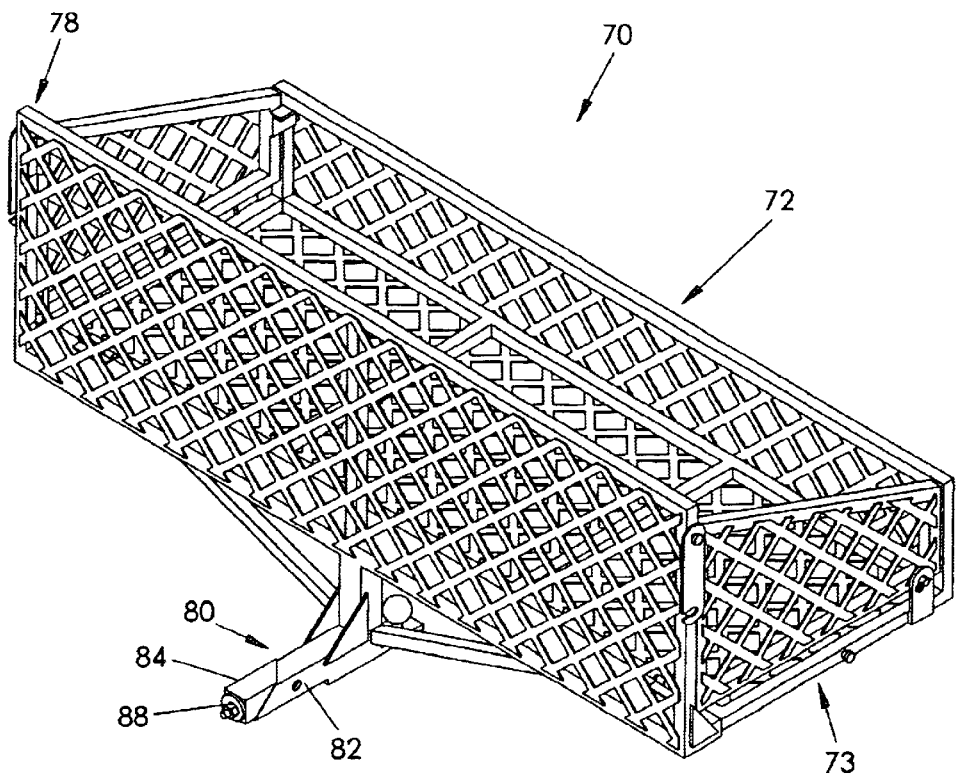
FIG. 9 is a perspective view of a cargo carrying basket according to another embodiment of the present invention.
Figure 10:
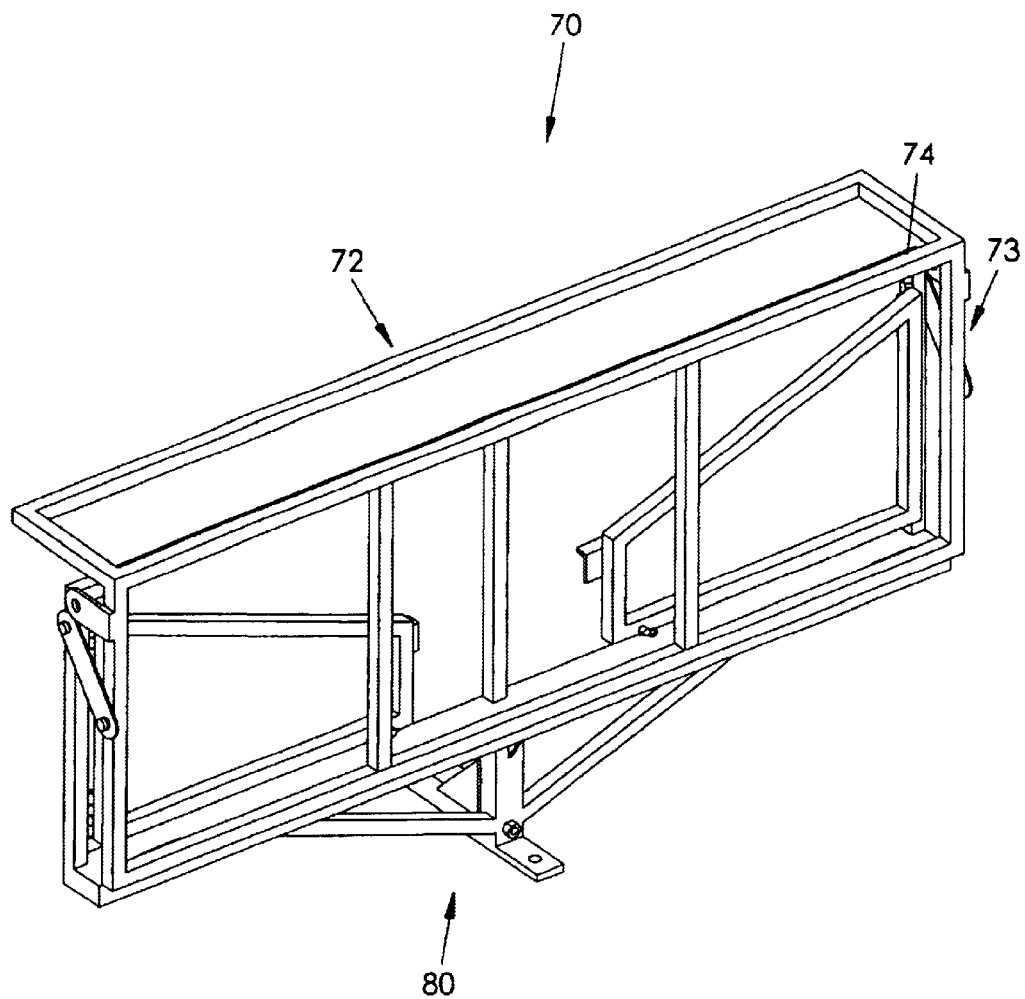
FIG. 10 is a perspective view of the basket as in FIG. 9 taken from another angle and with the mesh material and ball hitch removed and shown in a collapsed configuration.
Figure 11:
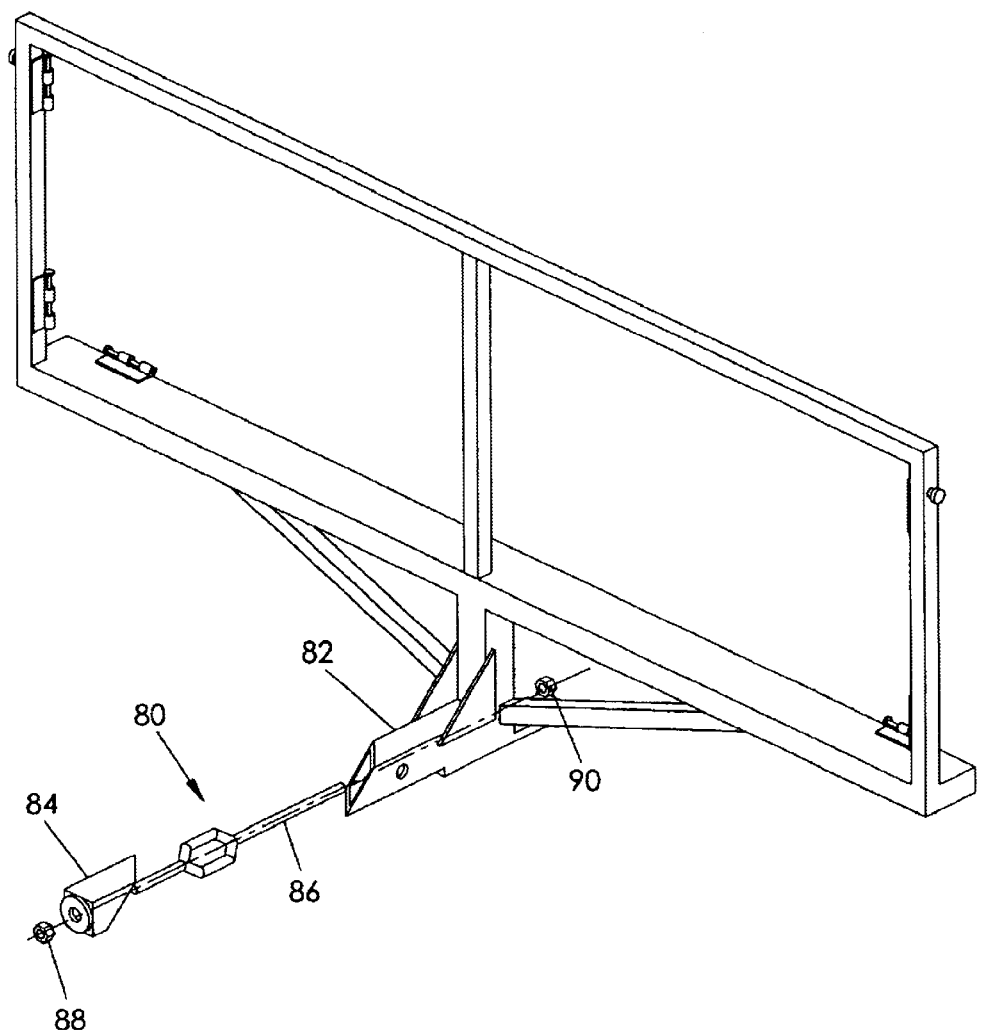
FIG. 11 is an exploded view of a mounting bar as in FIG. 9 with the platform, side walls and rear wall removed.

Another embodiment of the cargo carrying basket 70 is shown in FIGS. 9 through 11 and includes a construction that is substantially similar to the construction described above except as specifically noted below. In this embodiment, the rear wall 72 includes a fixed construction relative to the platform 73. ore particularly, the lower frame bar 74 of the rear wall framework is integrally attached to the the platform framework such that the rear wall 72 remains perpendicular to the platform 73 (FIG. 9). When the platform 73 is pivotally moved to its folded configuration, the rear wall 72 simply extends beyond the upper frame bar of the front wall 78 and is perpendicular relative to the front wall 78 (FIG. 10). The mounting bar 80 also includes a modified construction. As best shown in FIG. 11, the mounting bar 80 includes a tongue portion 82 having a hollow configuration and defining an open end with an offset configuration. The mounting bar 80 also includes a wedge portion 84 defining an open end with an offset configuration. A rod 86 extends through the hollow interior of the mounting bar 80 and is attached to each end thereof with forward 88 and rearward 90 nuts. As the nuts are tightened, the wedge 84 and tongue portion 82 are drawn against each other and the wedge overlaps the end of the tongue portion in a ramp relationship. In other words, tightening the rearward nut 90 causes the wedge 84 to slide up the ramp created by the offset end of the tongue portion 82 and thus increases the circumference of the mounting bar 80. This increase in circumference tightens the mounting bar 80 within the vehicle's hitch sleeve so as to remove any play therein and removes the need for bumper brackets.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A foldable cargo carrying basket for mounting to a vehicle hitch sleeve, comprising:
    a mounting bar having first and second ends, said first end adapted to be removably coupled to the hitch sleeve of a vehicle and said second end having a ball hitch attached thereto;
    an elongate main frame member defining a width and having opposed ends;
    an upstanding support bar fixedly attached to said mounting bar intermediate said first and second ends thereof and extending between said mounting bar and said main frame member;
    an upstanding front wall having a front wall framework attached to said main frame member, said front wall framework having opposed upstanding struts connected to corresponding ends of said main frame member;
    a platform having a platform framework pivotally coupled to said main frame member and selectively movable between a first configuration generally perpendicular to said front wall and a second configuration generally parallel to said front wall; and
    a pair of side walls, each side wall having a side wall framework connected to a respective strut of said front wall framework.

2. The cargo carrying basket as in claim 1 wherein said platform includes a mesh material overlying said platform framework and said front and side walls include a mesh material overlying said front and side wall frameworks, respectively.

3. The cargo carrying basket as in claim 1 further comprising a rear wall having a rear wall framework connected to said platform framework and being generally perpendicular to said platform and spaced apart from said front wall.

4. The cargo carrying basket as in claim 3 wherein said rear wall includes a mesh material overlying said rear wall framework thereof.

5. The cargo carrying basket as in claim 3 wherein said rear wall framework is pivotally connected to said platform framework such that said rear wall is selectively movable between a first configuration generally perpendicular to said platform and a second configuration generally parallel to and overlapping said platform.

6. The cargo carrying basket as in claim 1 wherein respective side wall frameworks are pivotally connected to said respective struts of said front wall framework such that said side walls are selectively movable between a first configuration generally perpendicular to said front wall and a second configuration generally parallel to and overlapping said front wall.

7. The cargo carrying basket as in claim 1 further comprising a pair of spaced apart stabilizer bars, each stabilizer bar extending between said support bar and a bottom side of said main frame member, whereby to stabilize and distribute the load of any cargo positioned upon said platform.

8. The cargo carrying basket as in claim 1 further comprising:
    a pair of spaced apart brackets coupled to respective upstanding struts of said front wall framework, each bracket having a generally L-shaped configuration for stabilizing said platform relative to a bumper of a vehicle; and
    means for slidably adjusting a vertical position of each bracket relative to said respective upstanding struts.

9. The cargo carrying basket as in claim 1 wherein said support bar includes an elongate construction such that said ball hitch may be utilized when said platform is at said first configuration generally perpendicular to said front wall.

10. A foldable cargo carrying basket for mounting to a vehicle, comprising:
    a mounting bar having first and second ends, said first end adapted to be removably coupled to the hitch sleeve of a vehicle and said second end having a ball hitch attached thereto;
    an elongate main frame member defining a width and having opposed ends;
    an upstanding support bar fixedly attached to said mounting bar intermediate said first and second ends thereof and extending between said mounting bar and said main frame member;
    a generally rectangular front wall having a front wall framework attached to said main support member and extending upwardly therefrom, said front wall framework having opposed struts extending upwardly from respective ends of said main frame member;
    a generally rectangular platform having a platform framework pivotally coupled to said main support member and selectively movable between a first configuration generally perpendicular to said front wall and a second configuration generally parallel to said front wall;
    a rear wall having a rear wall framework pivotally coupled to said platform framework and selectively movable between an upstanding configuration generally parallel to and spaced apart from said front wall framework and a folded configuration overlapping said platform; and a pair of side walls, each side wall having a side wall framework pivotally coupled to a respective upstanding strut of said front wall framework such that said side walls are selectively movable between a first configuration generally perpendicular to said front wall and a second configuration generally parallel to and overlapping said front wall, said side walls extending between said front and rear walls at said first configuration thereof.

11. The cargo carrying basket as in claim 10 further comprising means for releasably coupling each side wall framework to said rear wall framework when said side walls are at said first configuration and when said rear wall is at said upstanding configuration, whereby load forces caused by cargo positioned on said platform are distributed in part to said side walls when said side walls are at said first configuration.

12. The cargo carrying basket as in claim 10 further comprising a mesh material overlying said platform framework, said front wall framework, said rear wall framework, and said side wall frameworks.

13. The cargo carrying basket as in claim 12 wherein said mesh material is a metal grate.

14. The cargo carrying basket as in claim 10 further comprising means for releasably coupling said framework of each side wall to said platform framework when said rear wall is at said folded configuration, whereby load forces caused by cargo positioned on said platform are distributed in part to said side walls.

15. The cargo carrying basket as in claim 10 further comprising:

a pair of spaced apart stabilizer bars, each stabilizer bar extending between said support bar and a bottom side of said main frame member, whereby to stabilize and distribute the load of any cargo positioned upon said platform; and a pair of gussets extending between said mounting bar and said support bar for providing triangulated support of cantilevered load forces.

16. The cargo carrying basket as in claim 10 further comprising:

a pair of spaced apart brackets coupled to respective upstanding struts of said front wall framework, each bracket having a generally L-shaped configuration for stabilizing said platform relative to a bumper of a vehicle; and means for slidably adjusting a vertical position of each bracket relative to said respective upstanding struts.

17. The cargo carrying basket as in claim 10 wherein said support bar includes an elongate construction such that said ball hitch may be utilized when said platform is at said first configuration generally perpendicular to said front wall.

18. The cargo carrying basket as in claim 10 wherein:

said rear wall framework is pivotally coupled to said platform framework with a hinge; and said platform framework is pivotally coupled to said main frame member with a hinge.

19. The cargo carrying basket as in claim 10 wherein said mounting bar comprises:

a tongue portion having a hollow interior and an end with an offset configuration spaced from said second end of said mounting bar;

a wedge portion at said first end of said mounting bar, said wedge portion having an end with an offset configuration; and means for connecting said offset end of said wedge to said offset end of said tongue portion and for selectively urging said offset ends toward one another, said offset ends of said tongue and wedge portions causing an increase in a circumference of said mounting bar at the point of connection between respective offset ends as said respective offset ends are urged toward one another, whereby said mounting bar is held within the hitch sleeve of a vehicle in a friction-fit relationship.

20. The cargo carrying basket as in claim 10 further comprising means for releasably holding said platform at said second configuration generally parallel to said front wall.

\* \* \* \* \*